Feb. 5, 1946.    J. S. PECKER    2,394,472
AMPHIBIAN AIRCRAFT LANDING GEAR
Filed Aug. 13, 1943    2 Sheets-Sheet 1
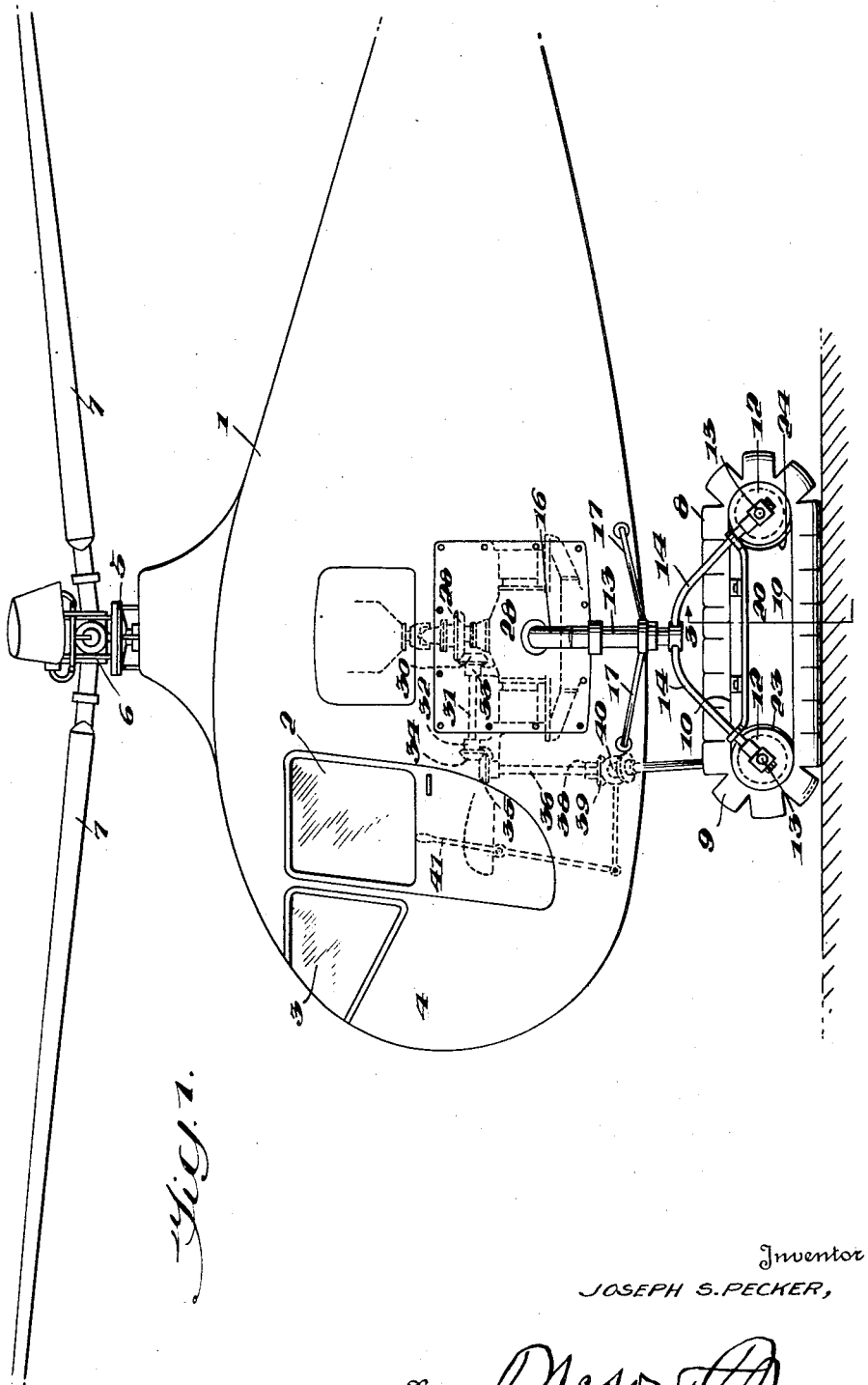
Inventor
JOSEPH S. PECKER,
By Mason Bass
Attorney Feb. 5, 1946. J. S. PECKER 2,394,472
AMPHIBIAN AIRCRAFT LANDING GEAR
Filed Aug. 13, 1943 2 Sheets-Sheet 2
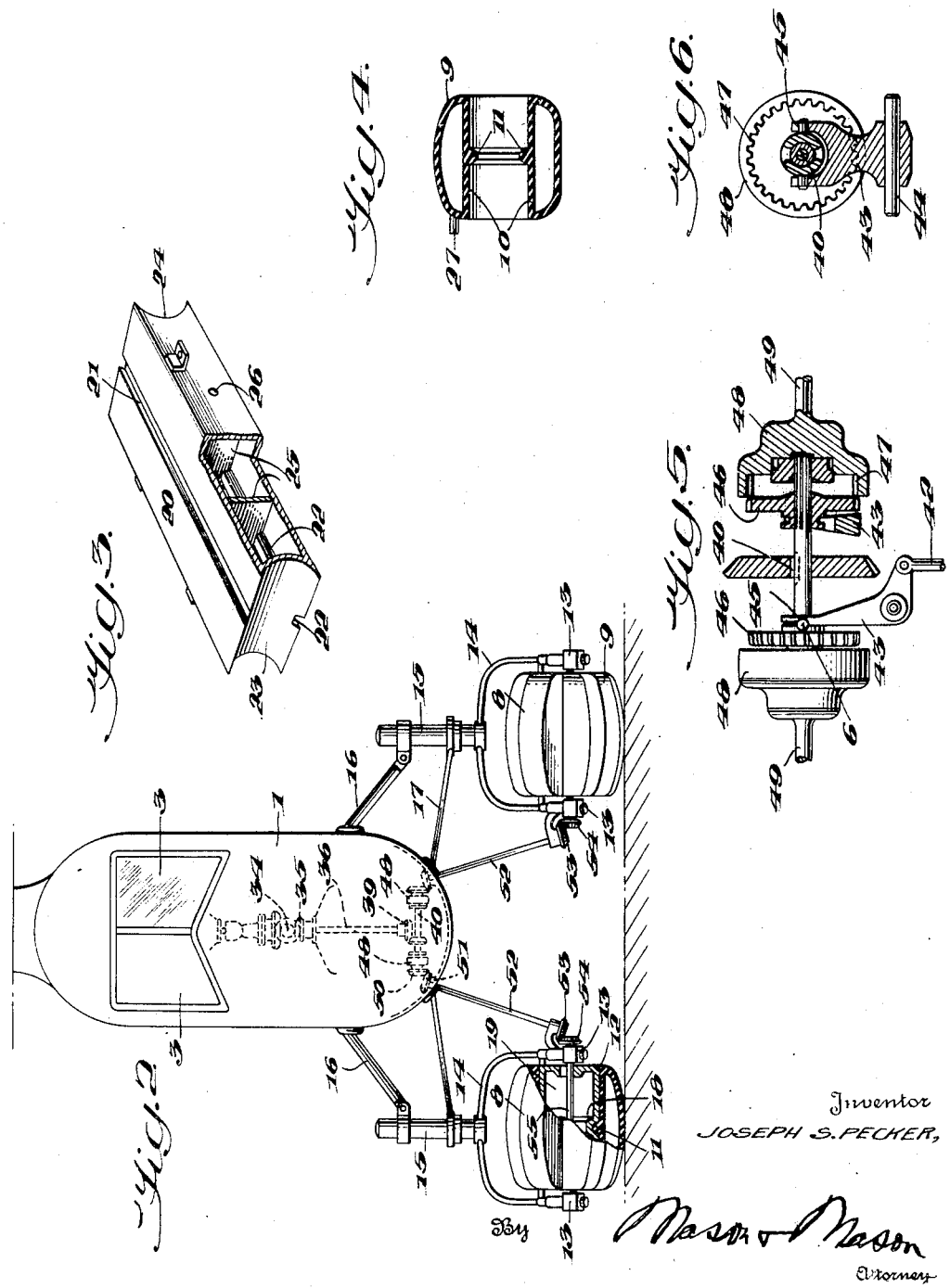
Inventor
JOSEPH S. PECKER,
By Mason & Mason
Attorney Patented Feb. 5, 1946

2,394,472

UNITED STATES PATENT OFFICE 2,394,472

AMPHIBIAN AIRCRAFT LANDING GEAR

Joseph S. Pecker, Philadelphia, Pa.

Application August 13, 1943, Serial No. 498,481

5 Claims. (Cl. 244—101)

This invention concerns a landing gear for aircraft, particularly helicopters and autogiros, whereby said aircraft is equally adapted to land on water or on the ground.

An object of the invention is to provide an amphibian landing gear for aircraft with means for steering the aircraft after it has landed, either on the water or on the ground, or for moving in a forward or in a rearward direction.

Another object of the invention is to provide a landing gear with which the aircraft will have ample buoyancy on the water, and which is so positioned with regard to the fuselage that a high free-board will be provided for said fuselage.

Another object of the invention is to provide a landing gear whereby the aircraft may with facility rise from the land or from the water and descend to the land or to the water.

A still further object of the invention is to provide amphibian means for aircraft which includes mechanism for driving the landing gear from the propeller shaft of the aircraft, and means to control the driving of said landing gear.

Another object of the invention is to provide landing gear for aircraft which includes a plurality of inflated tires or air-tight chambers, which chambers form part of a caterpillar tread, and means for driving said caterpillar tread.

An additional object of the invention is to provide a rigid support for the cabin to prevent resonance when bringing the rotor system up to speed prior to rising, or while standing on the ground.

Other objects and advantages will be stated throughout the specification, reference being had to the accompanying drawings.

In the drawings:

Figure 1 is a side elevation of a rotor wing aircraft partly broken away;

Figure 2 is a front elevation of the structure shown in Figure 1 without the rotor wing;

Figure 3 is a perspective view partly broken away of the pontoon tank enclosed by the caterpillar tread or rubber tire;

Figure 4 is a vertical section of the inflated rubber tire taken on the line 3—3 of Figure 1, but showing only the tire;

Figure 5 is a front elevation partly in section, of the clutch mechanism, and

Figure 6 is a view taken on the line 6—6 of Figure 5.

In the drawings the numeral 1 indicates the cabin of an autogiro or helicopter which is provided with a door 2, observation windows 3, and a nose 4. Extending above the cabin is swash plate mechanism indicated at 5 which is connected to the hub 6, which latter supports and drives the blades 7 of the rotor wing.

The aircraft is provided with a pair of caterpillars or pontoons assemblies generally designated by the numeral 8, these being of similar construction. The construction of these pontoons includes a plurality of blocks 9 of rubber or similar material, which are connected together by a lower web portion 10. The web portion 10 is provided with a central V-shaped rib 11.

As indicated in Figures 1 and 2, the forward and rear ends of each pontoon are supported on wheels 12 which are mounted in suitable bearings 13, which latter are supported by a yoke 14. Each yoke is supported by a shock absorber assembly 15 which is attached and held in position on the fuselage by strut members 16 and 17. It will be noted by reference to Figure 2 that the wheels 12 are each provided with a V-shaped recess or notch 18, which notch serves to drive the caterpillar tread by means of the rib 11.

It will be noted that the wheels 12 are indicated in Figure 2 (all wheels being of similar construction), as hollow as indicated at 19, and may have their interior sealed or entirely closed so as to add to the buoyancy of the caterpillar or pontoon assembly.

While the shock absorbers 15 have been indicated, these are not essential in the practice of this invention, as sufficient resiliency is provided by the caterpillar tread so that the expense incident to the provision of the shock absorbers 15 may be eliminated except in cases where the load is great.

In order to give added buoyancy to the pontoon assembly, each of them is provided with a hollow tank 20, shown in Figure 3, having V-shaped notches 21 and 22, extending longitudinally of its top and bottom portion, whereby the rib 11 may ride in said notches as driven by the wheels 12. Each end 23 and 24 is concave in shape so as to fit within and be positioned by the forward and rear wheels 12 of each pontoon assembly. The interior of the tank is divided by partition walls 25 and the spaces as defined by these walls may be inflated with air or gas to a suitable pressure so as to add to the buoyancy of the pontoon assembly.

Connection may be made at 26 for inflating the tank.

Optionally, the interior of the blocks 9 may be sealed from each other or connected to each other, so that each block may form a separate tube to be separately inflated, or there may be only one connection 27 for all of the blocks when the interior of the blocks are in communication with each other.

Mechanism for driving each set of forward wheels 12 so as to propel the tread which includes the spaced blocks 9, web portion 10 and the rib 11, includes a power off-take having a spur gear 28 mounted on the main drive shaft above the engine 29 of the aircraft. The gear 28 drives the spur gear 30 which is mounted on shaft 31 supported by bearings 32 and 33.

At the opposite end of the shaft 31 is a spur gear 34 which drives the gear 35 mounted on shaft 36, and supported by brackets 37 and 38. The lower end of the shaft 36 is provided with a spur gear 39 which drives through gear 39a a shaft 40, shown in Figures 1, 2, 5 and 6. Mounted on this shaft 40 is a suitable clutch whereby either the right or left hand pontoon assembly may be driven separately or in unison. This may be effected by the pilot who shifts the operating lever 41, shown in Figure 1, so as to cause the movement of the rods 42, one of which is shown in Figure 5, in either direction. Each rod operates a bell crank lever 43 pivoted at 44, and which engages a yoke 45 having thereon a gear 46 which meshes with the internally arranged teeth 47 of the drum 48. Each drum 48 is rigidly connected to a shaft 49 having a beveled gear 50, which latter meshes with the gear 51. This gear 51 is mounted on the shaft 52, whose opposite end is provided with a gear 53. The gear 53 drives the gear 54, which latter is fast on the shaft 55. Each shaft 55 is rigid with its forward driving wheel 12.

In the place of the clutch shown, a combined forward and reversing clutch may be used without departing from the spirit of this invention.

It will be further understood that the type of drive shown and described instead of being a gear drive could have substituted therefor any other well known drive such as belt gearing, worm drive, or any other suitable type. Such gearing would be substituted for the gearing indicated by the numerals 34–54 inclusive.

In actual practice the bottom of the tank 20 is provided with a plurality of spaced anti-friction rollers (not shown) upon which will ride the lower web portion 10 in order to eliminate friction and to prevent the web 10 from dragging against the tank bottom.

It will be appreciated from the above described construction that the autogiro or helicopter may land either on the water or upon the ground, and it may taxi over the ground or on the water in a forward direction, or by driving either the right or left hand pontoon assembly, as indicated by Figure 2, by operation of the rod 41, a turning action to right or left may be effected.

The construction shown and described may be made of light material, such as aluminum, and therefore very little weight will be added to the helicopter or autogiro, by the addition of the amphibian equipment herein described.

It will be understood that the above description and the accompanying drawings illustrate only one form of the invention, and that I do not desire to be limited in the practice of this invention except as defined by the appended claims.

What I claim is:

1. In a rotary wing aircraft having a cabin, a rotary wing and a source of power for rotating said wing of said aircraft; the combination with said aircraft of a pair of endless inflatable tracks, means on opposite sides of said aircraft for supporting said tracks, each track consisting of a continuous series of hollow chambers providing upper and lower runs with flexible means connecting said chambers, the arrangement being such that the lower runs of each track form a continuous substantially flat tread supporting surface, and said flexible connecting means permits said chambers to become separated at their tread surfaces during travel between the upper and lower runs of said tracks.

2. In a rotary wing aircraft having a cabin, a rotary wing and a source of power for rotating said wing of said aircraft; the combination with said aircraft of a pair of endless inflatable tracks, means on opposite sides of said aircraft for supporting said tracks, each track consisting of a continuous series of hollow chambers providing upper and lower runs with flexible means connecting said chambers, the arrangement being such that the lower runs of each track form a continuous substantially flat supporting tread surface, and said flexible connecting means permits said chambers to become separated at their tread surfaces during travel between the upper and lower runs of said tracks and means for driving said tracks from said source of power.

3. In a rotary wing aircraft having a cabin, a rotary wing and a source of power for rotating said wing of said aircraft; the combination with said aircraft of a pair of endless inflatable tracks, means on opposite sides of said aircraft for supporting said tracks, each track consisting of a continuous series of hollow chambers providing upper and lower runs with flexible means connecting said chambers, the arrangement being such that the lower runs of each track form a continuous substantially flat tread supporting surface, and said flexible connecting means permits said chambers to become separated at their tread surfaces during travel between the upper and lower runs of said tracks and a tank mounted between the upper and lower runs of said tracks.

4. In a rotary wing aircraft having a cabin, a rotary wing and a source of power for rotating said wing of said aircraft; the combination with said aircraft of a pair of endless inflatable tracks, means on opposite sides of said aircraft for supporting said tracks, each track consisting of a continuous series of hollow chambers providing upper and lower runs with flexible means connecting said chambers, the arrangement being such that the lower runs of each track form a continuous substantially flat supporting tread surface, and said flexible connecting means permits said chambers to become separated at their tread surfaces during travel between the upper and lower runs of said tracks and means for driving said tracks from said source of power and a clutch forming part of said driving means.

5. In a rotary wing aircraft having a cabin, a rotary wing and a source of power for rotating said wing of said aircraft; the combination with said aircraft of a pair of endless inflatable tracks, means on opposite sides of said aircraft for supporting said tracks, each track consisting of a continuous series of hollow chambers providing upper and lower runs with flexible means connecting said chambers, the arrangement being such that the lower runs of each track form a continuous substantially flat supporting tread surface, and said flexible connecting means permits said chambers to become separated at their tread surfaces during travel between the upper and lower runs of said tracks and a tank mounted between the upper and lower runs of said tracks, said tanks and the inner surfaces of said tracks having cooperating notches and ribs whereby to support and guide said tracks during rotation of the same about said tank.

JOSEPH S. PECKER.